(No Model.) 2 Sheets—Sheet 1.

A. G. McKENNA & H. T. WEED.
ELECTRIC METER.

No. 475,411. Patented May 24, 1892.

WITNESSES
N. M. Corwin
N. B. Corwin

INVENTORS.
Alex. G. McKenna
Henry T. Weed
by W. Bakewell & Sons
their Attorneys.

(No Model.) 2 Sheets—Sheet 2.

A. G. McKENNA & H. T. WEED.
ELECTRIC METER.

No. 475,411. Patented May 24, 1892.

Witnesses

Inventors
Alexander G. McKenna
Henry T. Weed
by W. Bakewell & Sons
Attorneys

THE NORRIS PETERS CO., PHOTO-LITHO., WASHINGTON, D. C.

UNITED STATES PATENT OFFICE.

ALEXANDER G. McKENNA, OF ALLEGHENY, PENNSYLVANIA, AND HENRY T. WEED, OF BROOKLYN, NEW YORK.

ELECTRIC METER.

SPECIFICATION forming part of Letters Patent No. 475,411, dated May 24, 1892.

Application filed July 14, 1891. Serial No. 399,441. (No model.)

*To all whom it may concern:*

Be it known that we, ALEXANDER G. MCKENNA, of Allegheny, in the county of Allegheny, State of Pennsylvania, and HENRY T. WEED, of Brooklyn, in the county of Kings and State of New York, have invented a new and useful Improvement in Electric Meters, of which the following is a full, clear, and exact description, reference being had to the accompanying drawings, forming part of this specification, in which—

Figure 1:
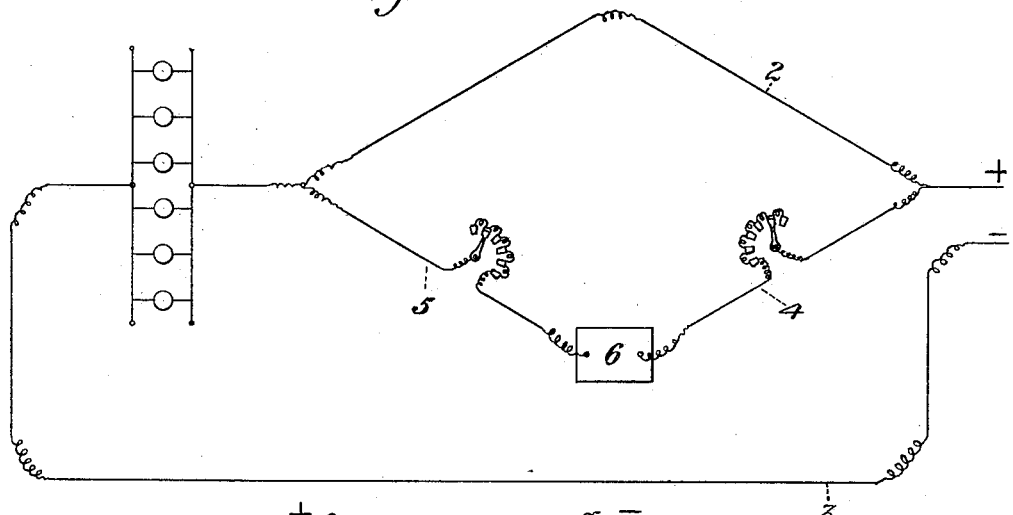
Figure 2:
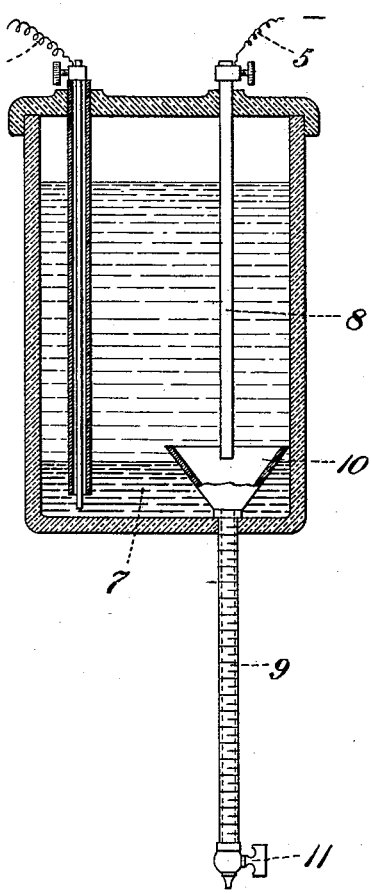
Figure 3:
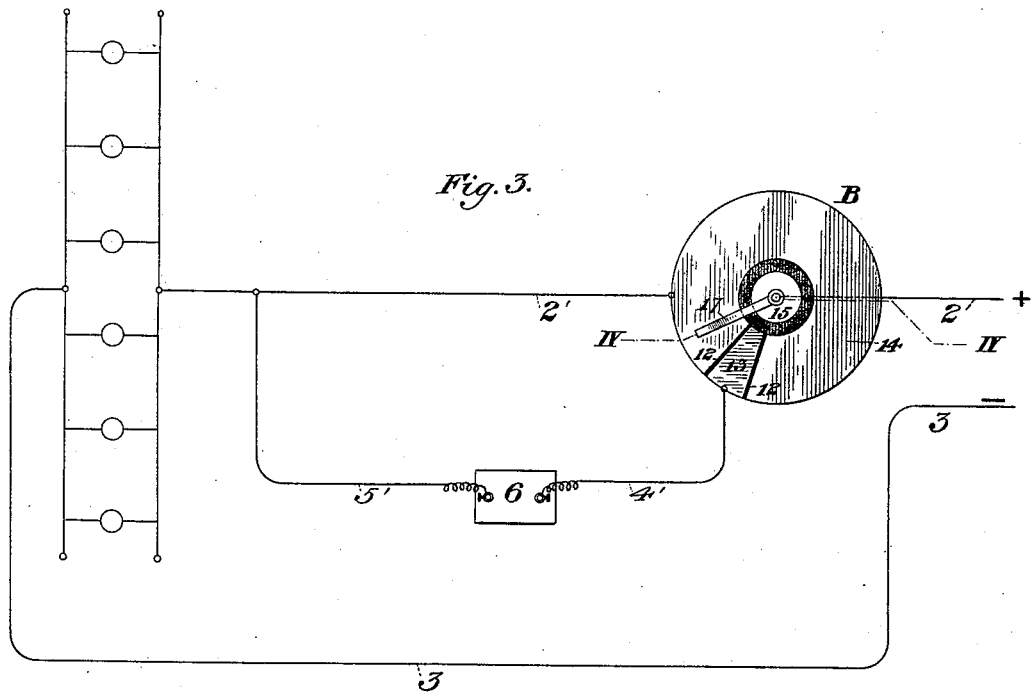
Figure 4:
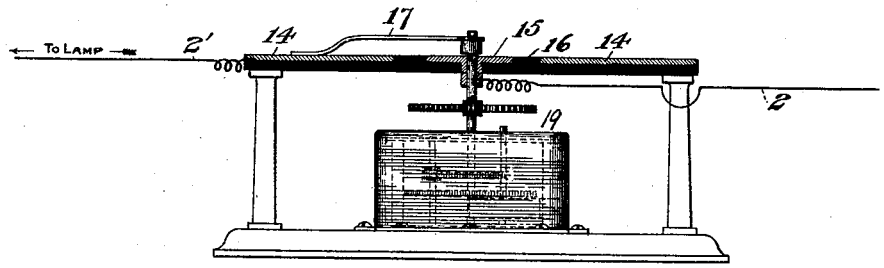

Figure 1 shows our improved apparatus in diagram plan view. Fig. 2 is a vertical section of the electrolytic meter-cell. Fig. 3 is a plan view of a switch which may be used in connection with our apparatus. Fig. 4 is a vertical section on the line IV IV of Fig. 3.

The object of our invention is to improve the construction of meters in which electric currents are measured by electrolytic action in such manner that instead of the tedious process of removing and weighing the electro-deposited metal necessary in apparatus as at present used the indication of the meter can be noted directly by observation of a deposit, which is collected and retained in a graduated tube or receptacle. The advantage of such improvement is that it enables the person using the meter to observe its registration at any time and without difficulty, whereas in meters of the ordinary form the measurement is practically obtainable only by a skilled person, who opens the instrument and weighs the deposit.

Our improved apparatus embodies an electrolytically-acting meter comprising an electrolytic cell containing a suitable mercurial salt, through which the whole or a part of the current passes, and provided with a suitable receptacle in which the metallic mercury liberated at the cathode is collected and in which its quantity can be measured and the indication of the meter thus obtained.

In the drawings, 2 3 represent the main conductors of an electric circuit used for obtaining light or power.

4 5 represent the conductor of a shunt-circuit containing a suitable resistance, so that a fraction only of the current shall pass through the same, and 6 represents an electrolytic cell. This cell may be constructed in various ways; but a convenient form is illustrated in Fig. 2, which we shall now describe. The positive electrode consists of a layer 7 of metallic mercury into which one of the branches of the shunt-circuit conductor extends. The other electrode 8 is preferably made of a graphite pencil, with which the conductor 5 is electrically connected, and beneath the latter electrode is a graduated glass tube 9, provided with a funnel-mouth 10, adapted to catch the electro-deposit of mercury, as hereinafter explained. Said tube may also have a stop-cock 11, by which its contents may be drawn off. We have found that a suitable electrolyte is a solution of the double salt of mercury and potassium cyanide, $(2KCN, HgC_2N_2;)$ but the invention is not limited thereto, since other mercurial-salt solutions may be employed. When the electrolyte is charged into the cell, so as to be in contact with the two electrodes, and an electric current passed through the main circuit, a known fractional portion of the current will pass through the shunt-circuit and through the cell and by electrolytic action will cause the decomposition of the salt, depositing at the electrode 8 metallic mercury which will drop therefrom into the tube and will collect therein. As the electrolyte is impoverished by such decomposition, it will be renewed constantly by taking up mercury from the layer of the metal in the cell. The quantity of mercury at any time deposited from the electrode 8 may be known by observing the height to which it rises as a liquid column in the tube 10, and by a simple process of calculation based upon the proportional part of the current which passes through the shunt-circuit and the known rate of decomposition of the electrolyte the amount of current which has passed through the circuit can be ascertained. The tabulated results of such calculation, which can be made with ease by any skilled electrician, can be indicated on a graduated scale applied to the tube, so that the indication can be read by those unfamiliar with the electrical art. From time to time, as the results of the measurement are noted and recorded, the metallic mercury can be drawn from the tube and poured back into the cell. The measurement may also be taken by drawing off the mercury and weighing it. The vessel in which the deposited mercury is caught may be charged with a suitable liquid, the displacement of which by the mercury will indicate the measurement. Instead of ascertaining the measurement of the meter by collecting the deposited mercury in a receptacle and noting the increase thereof the same result may be attained by measuring at any time the loss of the body of metal forming the anode, which can be contained in a graduated receptacle or may be drawn off and weighed.

The reason for employing a graphite pencil as the cathode is that it does not amalgamate with the mercury, as metallic electrodes are apt to do; but it should be understood that such electrode, though claimed specifically herein, does not form an element of limitation of our invention, broadly considered.

Instead of dividing the current by means of a constantly-closed shunt-circuit of definite resistance, so that a part only shall pass through the electrolytic cell, the same result may be obtained by employing a switch controlling the shunt, with clock mechanism which at definite periods and for definite times will shunt the whole current from the main circuit through the cell. This is shown in Figs. 3 and 4, in which B is a switch comprising an annular metal disk divided by narrow strips of insulating material 12 into a small segment 13 and a larger segment 14. In the center of this disk is a metal plate 15, separated from the outer disk by insulating material 16. 17 is a metal spring-arm journaled in the plate 15 and having its end in traveling contact with the disk 13 14. This arm is rotated at a uniform speed by clock-work 19 and is electrically connected with one of the main electrical conductors. The segment 14 is connected by the conductor 2' with the lamps, and the segment 13 is connected therewith by the conductors 4' and 5', forming a shunt in which is set the meter 6. As the arm 17 rotates, so long as it is in contact with the segment 14 the current passes through the arm and the conductor 2' directly to the lamps, but when it is in contact with the segment 13 (a definite proportion of its revolution) the current is shunted through the meter.

The advantages of our invention in respect of its simplicity and the facility for measurement which it affords will be appreciated by those skilled in the art.

We claim—

1. In an electric meter, an electrolytic cell containing a mercurial salt and having suitable electrodes and a receptacle for catching the deposited mercury, substantially as and for the purposes described.

2. In an electric meter, an electrolytic cell containing a mercurial salt and having suitable electrodes, one of which is a body of metallic mercury, and a receptacle for catching the deposited mercury, substantially as and for the purposes described.

3. In an electric meter, an electrolytic cell containing a mercurial salt and having suitable electrodes, of which the cathode is of carbon, and a receptacle for catching the deposited mercury, substantially as and for the purposes described.

4. In an electric meter, an electrolytic cell containing a mercurial salt and having suitable electrodes and a glass receptacle for catching the deposited mercury, substantially as and for the purposes described.

5. In an electric meter, an electrolytic cell containing an electrolyte and having suitable electrodes and a measuring-receptacle for catching the deposited cation, substantially as and for the purposes described.

6. In an electric meter, an electrolytic cell containing a mercurial salt and having suitable electrodes and a receptacle for the cation, substantially as and for the purposes described.

7. In an electric meter, an electrolytic cell containing a mercurial salt and having suitable electrodes, one of which is a body of metallic mercury, and a receptacle for the cation, substantially as and for the purposes described.

In testimony whereof we have hereunto set our hands this 9th day of July, A. D. 1891.

ALEX. G. McKENNA.
HENRY T. WEED.

Witnesses:
DAVID S. McCANN,
H. M. CORWIN.